US009912993B2

(12) United States Patent
Hulse et al.

(10) Patent No.: US 9,912,993 B2
(45) Date of Patent: *Mar. 6, 2018

(54) COAX SERVER ACTING AS PROXY BETWEEN COAX TRANSMISSION INFRASTRUCTURE AND INTERNET PROTOCOL (IP) TRANSMISSION INFRASTRUCTURE FOR MEDIA ON DEMAND CONTENT

(71) Applicant: Guest Tek Interactive Entertainment Ltd., Calgary (CA)

(72) Inventors: David Andrew Hulse, Athens (GR); David Nicol, Edinburgh (GB); Stuart Clark, Glasgow (GB); Mark Howard Bryars, Zurich (CH)

(73) Assignee: Guest Tek Interactive Entertainment Ltd., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/754,228

(22) Filed: Jun. 29, 2015

(65) Prior Publication Data
US 2015/0304723 A1 Oct. 22, 2015

Related U.S. Application Data

(63) Continuation of application No. 12/463,993, filed on May 11, 2009, now Pat. No. 9,078,033.

(Continued)

(51) Int. Cl.
*H04N 21/472* (2011.01)
*H04N 21/442* (2011.01)
(Continued)

(52) U.S. Cl.
CPC ......... *H04N 21/47202* (2013.01); *H04N 7/10* (2013.01); *H04N 7/17318* (2013.01);
(Continued)

(58) Field of Classification Search
None
See application file for complete search history.

(56) References Cited

U.S. PATENT DOCUMENTS

| 6,041,056 A | 3/2000 | Bigham et al. |
| 7,324,515 B1 * | 1/2008 | Chapman ............ H04L 12/2801 370/392 |

(Continued)

FOREIGN PATENT DOCUMENTS

| CN | 1674473 A | 9/2005 |
| CN | 101166068 A | 4/2008 |

(Continued)

OTHER PUBLICATIONS

European Extended Search Report dated Jun. 18, 2010 by EPO in counterpart European Patent Application No. 10157066.1.

(Continued)

*Primary Examiner* — Justin Shepard
(74) *Attorney, Agent, or Firm* — ATMAC Patent Services Ltd.; Andrew T. MacMillan

(57) ABSTRACT

A coax server acts as a proxy between a coax transmission infrastructure and an Internet Protocol (IP) transmission infrastructure. An incoming request is received from a particular one of a plurality of coax client devices on the coax infrastructure. A request for specific media content is transmitted to a media-on-demand server in response to receiving the incoming request. A media stream is received over the IP infrastructure from the media-on-demand server, the media stream corresponding to the specific media content, and the coax server allocates a coax channel of sufficient bandwidth on the coax infrastructure and transmits the media stream on the coax channel utilizing the RF modulation scheme. A pointer indicating the coax channel on which the media stream is being transmitted is sent to the (Continued)

particular coax client device. The coax channel is unknown to other of the coax client devices besides the particular coax client device.

21 Claims, 5 Drawing Sheets

Related U.S. Application Data

(60) Provisional application No. 61/164,253, filed on Mar. 27, 2009.

(51) Int. Cl.

| H04N 21/239 | (2011.01) |
|---|---|
| H04N 21/266 | (2011.01) |
| H04N 21/238 | (2011.01) |
| H04N 21/24 | (2011.01) |
| H04N 21/647 | (2011.01) |
| H04N 21/262 | (2011.01) |
| H04N 21/2385 | (2011.01) |
| H04N 7/10 | (2006.01) |
| H04N 7/173 | (2011.01) |
| H04N 21/214 | (2011.01) |
| H04N 21/434 | (2011.01) |
| H04N 21/61 | (2011.01) |
| H04N 21/643 | (2011.01) |
| H04H 20/77 | (2008.01) |

(52) U.S. Cl.
CPC ..... *H04N 7/17336* (2013.01); *H04N 21/2143* (2013.01); *H04N 21/238* (2013.01); *H04N 21/239* (2013.01); *H04N 21/2385* (2013.01); *H04N 21/24* (2013.01); *H04N 21/2402* (2013.01); *H04N 21/26216* (2013.01); *H04N 21/26616* (2013.01); *H04N 21/4345* (2013.01); *H04N 21/442* (2013.01); *H04N 21/44209* (2013.01); *H04N 21/6118* (2013.01); *H04N 21/6168* (2013.01); *H04N 21/64322* (2013.01); *H04N 21/64738* (2013.01); *H04H 20/77* (2013.01)

(56) References Cited

U.S. PATENT DOCUMENTS

| 7,477,285 | B1* | 1/2009 | Johnson | G06F 19/327 |
|---|---|---|---|---|
| | | | | 348/143 |
| 9,078,033 | B2 | 7/2015 | Nicol et al. | |
| 2001/0036199 | A1 | 11/2001 | Terry | |
| 2002/0046406 | A1 | 4/2002 | Chelehmal et al. | |
| 2005/0183120 | A1* | 8/2005 | Jain | H04N 7/17336 |
| | | | | 725/46 |
| 2006/0171390 | A1* | 8/2006 | La Joie | H04L 12/2801 |
| | | | | 370/390 |
| 2006/0248213 | A1 | 11/2006 | Sherer et al. | |
| 2007/0081537 | A1 | 4/2007 | Wheelock | |
| 2007/0094691 | A1 | 4/2007 | Gazdzinski | |
| 2007/0107013 | A1 | 5/2007 | Seppala et al. | |
| 2007/0153820 | A1 | 7/2007 | Gould | |
| 2007/0240192 | A1 | 10/2007 | Acharya et al. | |
| 2009/0036152 | A1 | 2/2009 | Janneteau et al. | |
| 2009/0133086 | A1* | 5/2009 | Trimper | H04N 7/17318 |
| | | | | 725/116 |
| 2009/0232088 | A1 | 9/2009 | Wisely | |
| 2010/0031288 | A1 | 2/2010 | Scott et al. | |
| 2010/0071000 | A1* | 3/2010 | Amento | H04N 7/173 |
| | | | | 725/39 |

FOREIGN PATENT DOCUMENTS

| CN | 101346006 A | 1/2009 |
|---|---|---|
| EP | 1 953 936 A2 | 8/2008 |
| KR | 100 841 918 | 6/2008 |
| WO | 02/104024 A1 | 12/2002 |
| WO | 03/049445 A2 | 6/2003 |
| WO | 2005/002057 A2 | 1/2005 |
| WO | 2007117613 A2 | 10/2007 |

OTHER PUBLICATIONS

VideoPropulsion—Bandwidth Connecting People to Content, Torrent Q20IP 20 Channel RF EdgeQAM, http://www.videopropulsion.com/products/q20ip, 2 pages, Copyright Feb. 2, 2009.

Office action dated Dec. 2, 2014 by Australian Patent Office in counterpart Australian application No. Au 2010201029.

Office action dated Nov. 14, 2014 by SIPO in counterpart Chinese application No. CN 201010149422.7.

Office action dated Nov. 5, 2013 by SIPO in counterpart Chinese application No. CN 201010149422.7.

Office action dated Oct. 31, 2012 by EPO in counterpart European Patent Application No. 10157066.1.

Office action dated May. 24, 2013 by EPO in counterpart European Patent Application No. 10157066.1.

* cited by examiner

COAX SERVER ACTING AS PROXY BETWEEN COAX TRANSMISSION INFRASTRUCTURE AND INTERNET PROTOCOL (IP) TRANSMISSION INFRASTRUCTURE FOR MEDIA ON DEMAND CONTENT

CROSS-REFERENCE TO RELATED APPLICATIONS

The present application is a continuation of U.S. patent application Ser. No. 12/463,993 filed on May 11, 2009, which is a non-provisional of U.S. Provisional Patent Application Ser. No. 61/164,253 filed on Mar. 27, 2009. Both of these applications are incorporated herein by reference.

BACKGROUND OF THE INVENTION (1) Field of the Invention

The present invention relates to providing digital information and/or data services over hybrid network infrastructures including both IP and coax transmission media.

(2) Description of the Related Art

Current practice within enhanced digital television and video-on-demand (VOD) systems is to deliver digital TV and VOD services either using RF frequencies over existing coaxial cable (coax) infrastructure (e.g., via QAM data transfer or highly segmented coax loops with IP-over-coax data transfer), or via Internet Protocol (IP) solutions (e.g., via Ethernet cable infrastructure using IP).

In the hospitality industry, a large segment of the market for such services still relies heavily on coax infrastructure; some entirely, and others having newer parts of their infrastructures being IP-based while older parts still employ coax.

IP-over-coax solutions are characterized by an inherent problem in that coax does not have the available bandwidth to deliver the television and video services people demand using this approach; particularly high definition video. IP-over-coax also requires fairly radical modifications to conventional coax infrastructure to make it work at all. That is, in order to provide sufficient bandwidth, the long loops employed by conventional coax infrastructures must be segmented into much smaller loops or segments.

Cable television providers have long provided television and video services over coax using quadrature amplitude modulation (QAM) in the downstream direction, and IP-over-coax for the return path (which typically has much lower bandwidth requirements). The combination of QAM in one direction and IP-over-coax in the other allows such solutions to avoid having to make the alterations to the existing coax infrastructure required by a fully IP-over-coax solution.

However, these solutions do not address the needs of facilities having infrastructures which include both IP and coax. An example would be a hotel with an older wing that only has a coax network infrastructure, and a newer wing having an IP infrastructure. In such facilities, separate solutions are typically required to provide data and video services to the guest rooms on both infrastructures.

BRIEF SUMMARY OF THE INVENTION

Various methods and apparatus are provided for providing digital information and/or data services over hybrid network infrastructures including both IP and coax transmission media.

According to a particular class of embodiments, a network is provided which includes a first transmission infrastructure comprising coaxial cable over which data are transmitted using a radio frequency (RF) modulation scheme. The network also includes a second transmission infrastructure over which data are transmitted using the Internet Protocol (IP). One or more data servers are configured to provide data services including both digital television services and video-on-demand services. One or more coax servers are configured to receive via the second transmission infrastructure first data transmissions originating from the one or more data servers and intended for first client devices connected to the first transmission infrastructure. The one or more coax servers are further configured to convert the first data transmissions for transmission to the first client devices over the first transmission infrastructure using the RF modulation scheme. The one or more data servers provide the data services to the first client devices via the one or more coax servers and the first transmission infrastructure, and to second client devices connected via the second transmission infrastructure.

According to another class of embodiments, a coax server is provided for use in a network including a first transmission infrastructure comprising coaxial cable over which data are transmitted using a radio frequency (RF) modulation scheme, and a second transmission infrastructure over which data are transmitted using the Internet Protocol (IP). The network further includes one or more data servers configured to provide data services including both digital television services and video-on-demand services. The coax server includes one or more coax ports configured for connection to the first transmission infrastructure. The coax server further includes one or more IP ports configured for connection to the second transmission infrastructure and to receive first data transmissions originating from the one or more data servers and intended for first client devices connected to the first transmission infrastructure. The coax server further includes an up-converter configured to convert the first data transmissions for transmission to the first client devices over the first transmission infrastructure using the RF modulation scheme. The coax server further includes a program stream manager configured to provide coax channel mapping information to at least one of the one or more data servers. The coax channel mapping information including coax channel tuning information for specific program streams generated by the one or more data servers. The coax channel mapping information is configured to enable the first client devices to receive selected ones of the specific program streams.

According to another class of embodiments, methods and apparatus are provided for providing data services in a network including a first transmission infrastructure comprising coaxial cable over which data are transmitted using a radio frequency (RF) modulation scheme, and a second transmission infrastructure over which data are transmitted using the Internet Protocol (IP). The network further including one or more data servers configured to provide the data services. The data services including both digital television services and video-on-demand services. First data transmissions are received which originate from the one or more data servers and are intended for first client devices connected to the first transmission infrastructure. The first data transmissions are converted for transmission to the first client devices over the first transmission infrastructure using the RF modulation scheme. Coax channel mapping information is provided to at least one of the one or more data servers. The coax channel mapping information includes coax channel tuning information for specific program streams generated by the one or more data servers. The coax channel mapping information is configured to enable the first client devices to receive selected ones of the specific program streams.

According to an exemplary embodiment, disclosed is a system including a coax transmission infrastructure formed by coaxial cable over which data are transmitted using a radio frequency (RF) modulation scheme. The system further includes a plurality of coax client devices each including an RF tuner supporting the RF modulation scheme connected to the coax transmission infrastructure. The system further includes an Internet Protocol (IP) transmission infrastructure formed by twisted pair wire over which data are transmitted using IP. The system further includes a media on demand server connected to the IP transmission infrastructure; and a coax server coupled to both the coax transmission infrastructure and the IP transmission infrastructure for acting as a proxy between these two infrastructures. When acting as the proxy between the coax transmission infrastructure and the IP transmission infrastructure, the coax server is operable to transmit a request for specific media content to the media on demand server in response to receiving an incoming request from a particular one of the coax client devices, and receive a media stream over the IP transmission infrastructure from the media on demand server, the media stream corresponding to the specific media content. The coax server is further operable to allocate a coax channel of sufficient bandwidth on the coax transmission infrastructure and transmit the media stream on the coax channel utilizing the RF modulation scheme; and send to the particular coax client device a pointer indicating the coax channel on which the media stream is being transmitted. The coax channel on which the media stream is transmitted is unknown to other of the coax client devices besides the particular coax client device.

According to another exemplary embodiment, disclosed is a method of acting as a proxy between a coax transmission infrastructure and an Internet Protocol (IP) transmission infrastructure. The method includes receiving an incoming request from a particular one of a plurality of coax client devices coupled to the coax transmission infrastructure. The coax transmission infrastructure is formed by coaxial cable over which data are transmitted using a radio frequency (RF) modulation scheme, and the coax client devices each include an RF tuner supporting the RF modulation scheme. The method further includes transmitting a request for specific media content to a media on demand server in response to receiving the incoming request from the particular coax client device. The IP transmission infrastructure is formed by twisted pair wire over which data are transmitted using IP, and the media on demand server is connected to the IP transmission infrastructure. The method further includes receiving a media stream over the IP transmission infrastructure from the media on demand server, the media stream corresponding to the specific media content; and allocating a coax channel of sufficient bandwidth on the coax transmission infrastructure and transmitting the media stream on the coax channel utilizing the RF modulation scheme. The method further includes sending to the particular coax client device a pointer indicating the coax channel on which the media stream is being transmitted. The coax channel on which the media stream is transmitted is unknown to other of the coax client devices besides the particular coax client device.

A further understanding of the nature and advantages of the present invention may be realized by reference to the remaining portions of the specification and the drawings.

DETAILED DESCRIPTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to various embodiments of the invention, a system is provided in which a single solution simultaneously provides information and/or data services via both types of infrastructure, i.e., over both IP (e.g., implemented using CAT-5 or CAT-5e cabling and/or wireless networking components) and coax (implemented using coaxial cable) transmission media. One or more coax servers are provided in the system which operate as media converters, converting traffic between the IP and coax domains. Thus, if a property or installation includes both types of network infrastructure, its data and video needs may be provided with a single solution. In addition, if a property plans to convert its infrastructure from coax to IP (either gradually or all at once), the solution provided by the present invention allows for such conversion without a substantial re-investment during or after the conversion. The coax server sits between the IP infrastructure and the coax infrastructure and acts as a proxy for the coax infrastructure, i.e., the multimedia IP infrastructure is not aware of the existence of the coax infrastructure.

Figure 1:
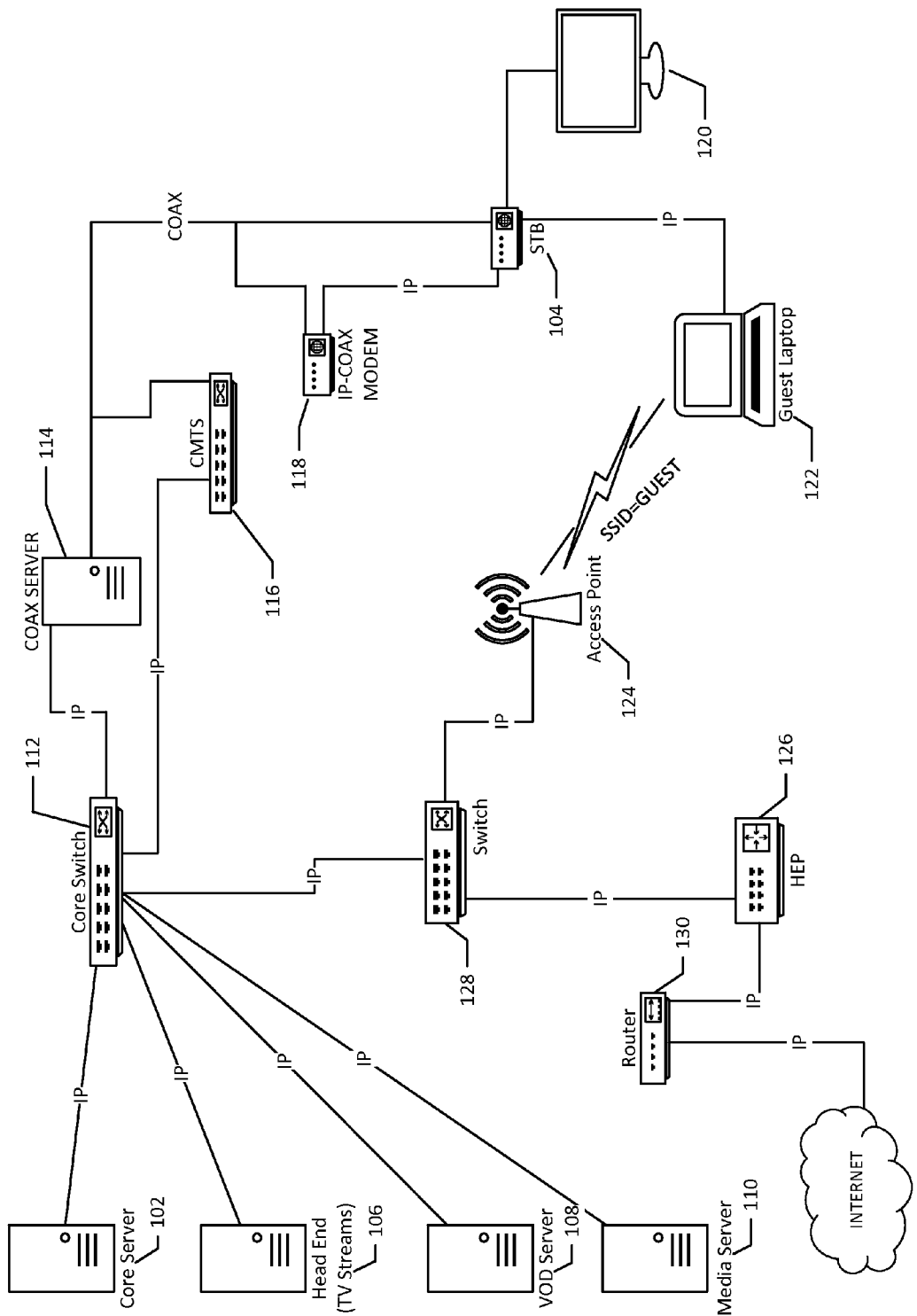
FIG. 1 is a simplified network diagram illustrating a network architecture implemented according to a specific embodiment of the invention having a coax modem IP return path.
Figure 4:
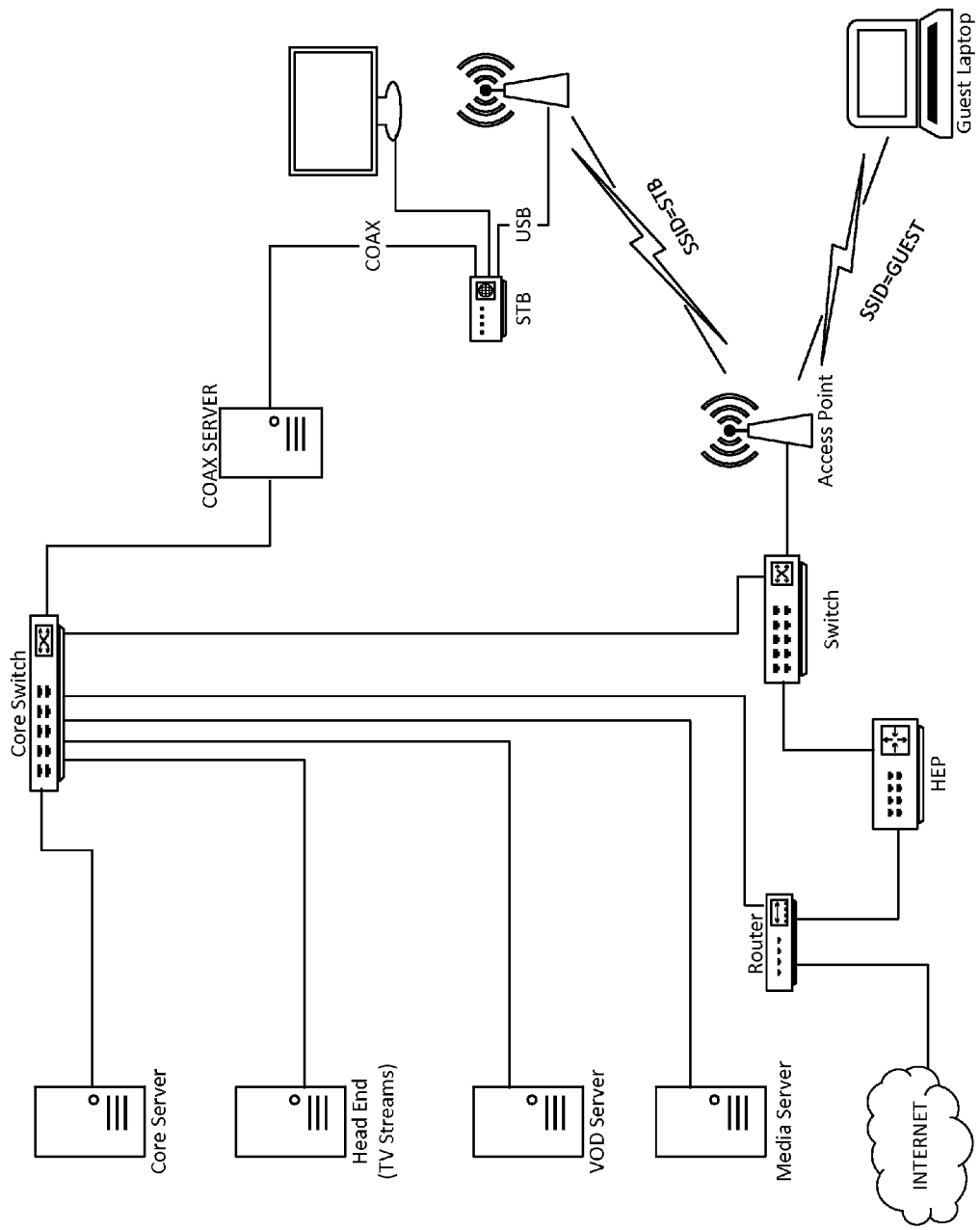
FIG. 4 is a simplified network diagram illustrating a network architecture implemented according to another embodiment of the invention having a WiFi IP return path.

FIG. 1 is a network diagram of a hybrid IP and coax system implemented in accordance with a specific embodiment of the invention. In this example, the hybrid infrastructure is deployed in a hotel property, and provides a variety of services including digital television and video-on-demand (VOD) (in both standard and high definition, SD and HD), Internet access, and a variety of other guest services including, for example, remote checkout, wake up calls, room service, etc. It should be noted that this is merely one example of a context in which such a hybrid infrastructure might be implemented in accordance with the invention. Other implementation contexts as well as a broad range of services and service sets are contemplated to be within the scope of the invention. That is, any infrastructure context in which both types of network infrastructure exist or are desirable may benefit from the present invention. For example, FIG. 4 illustrates another architecture example with a WiFi IP return path.

A core server 102 provides the set top boxes (STBs) in the system, e.g., STB 104, with user interfaces (including language translation), firmware updates, billing management, etc. It also hosts the system database and billing system. Core server 102 is what the system's STBs communicate with to facilitate access to and/or the purchase of services by hotel guests. According to a specific implementation, core server 102 employs Apache web server and Apache Tomcat which is an implementation of the Java Servlet and JavaServer Pages technologies.

Head end server 106 (typically an array of servers) receives the digital television channels from any of a variety of sources (e.g., European DVB-C signals, U.S. proprietary satellite signals, etc.) and makes them available for transmission to STBs on both parts of the infrastructure. Head end server 106 may encrypt the signals, or employ the encryption required by the content provider.

VOD server 108 (again typically an array of servers) hosts the "on demand" video content (e.g., feature films) and makes this content available for transmission to requesting users. VOD server 108 enables video control functionality such as play, pause, fast forward, rewind, skip forward, skip back, etc. Examples of VOD servers that may be employed with systems implemented according to specific embodiments are provided by BitBand Technologies Ltd. of Netanya, Israel.

Media server 110 provides content previews (e.g., movie trailers) and other promotional content with a stripped down set of the typical video control functions, e.g., skip forward and back, but no fast forward or rewind. Media server 110 also provides backdrop videos.

Core switch 112 (e.g., a network switch from Cisco Systems, Hewlett-Packard, etc.) provides the connections between the various IP-based servers and coax server 114 and IP-coax modem 116. As described in greater detail below, coax server 114 provides the media conversion from the IP domain to the coax domain for the IP-based servers, i.e., head end server 106, VOD server 108, and media server 110. Cable modem termination system (CMTS) 116 provides the conversion to and from IP-over-coax for the transmissions between core server 102 and the STBs on the coax infrastructure, e.g., STB 104. That is, in the depicted embodiment, the lower bandwidth requirements of the traffic to and from core server 102 allow for the use of IP-over-coax as the transmission mechanism on the coax infrastructure. Thus, in this particular implementation, the return path from the STBs is an IP-over-coax path.

An IP-coax modem 118 is in the guest rooms on the coax infrastructure to demodulate the downstream IP-over-coax signals to standard Ethernet for STB 104 as well as to modulate the signals from STB 104 for transmission upstream. A QAM tuner (not shown) in STB 104 is connected to the coax infrastructure for receiving the program streams from the Coax Server 114 originating from the IP-based servers. STB 104 then provides its output to television 120. STB 104 also receives input from a remote control (not shown) in the guest room which is the primary mechanism used by the guest to navigate user interfaces on TV 120 and to select from among and purchase the variety of available services.

Guests may connect their personal computing devices, e.g., guest laptop 122, to the system via wireless access points, e.g., WAP 124, which are in turn connected to Internet access server 126 via switch 128. The final connection to the Internet for the traffic to and from both core switch 112 and switch 128 is provided via router 130. Internet access server may be provided, for example, by iBAHN of Salt Lake City, Utah. As shown, guests may also establish a wired connection to the Internet by plugging their laptops into STB 104 (e.g., via an Ethernet port) which then employs the IP return path provided by IP-coax modems 116 and 118. Alternatively, the return path through IP-coax modems 116 and 118 may be established via a wireless access point (not shown) situated between laptop 122 and IP-coax modem 118.

According to various embodiments, coax server 114 operates primarily as a media converter that converts from Ethernet in the IP domain to QAM in the coax domain. According to a specific implementation, coax server 114 operates on a Linux platform and converts multiple MPEG-2 (SD or HD) or H.264 (HD) Single Program Transport Streams via Ethernet (IPTV) to several Multiple Program Transport Stream via coax using the DVB-C standard at QAM256. It should be noted that other standards may be employed.

A coax program refers to a single television, VOD, or data program stream. Multiple programs are multiplexed together and broadcast on a coax channel which is defined by a center frequency. Each transport stream is allocated a slot in the available bandwidth of an output channel. It should be noted that QAM is merely one example of a modulation scheme by which bandwidth in a coax infrastructure may be allocated. Other modulation schemes (e.g., quadrature phase shift keying (QPSK)) are within the scope of the invention.

According to a particular implementation, the programs from head end server 106 and from VOD server 108 are handled differently. IPTV streams from head end server 106 are always allocated coax programs since these are essentially always on. By contrast, and depending on viewer demands, VOD streams are assigned a coax program when requested. As described below, because STB 104 communicates with coax server 114 rather than directly with VOD server 108, coax server 114 includes a Real-Time Streaming Protocol (RTSP) Proxy Server/Client to manage VOD content.

Figure 2:
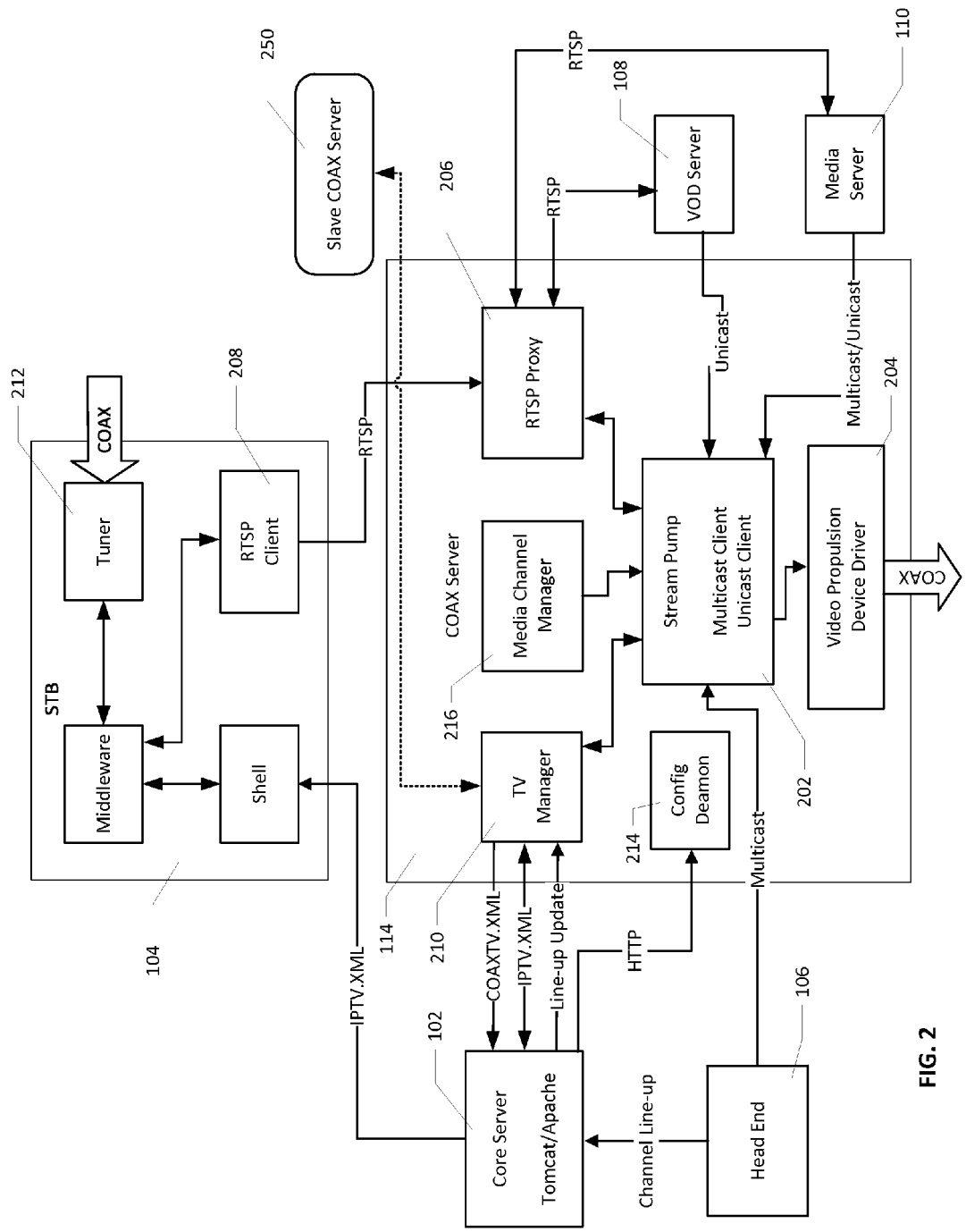
FIG. 2 is a block diagram of coax server implemented according to a specific embodiment of the invention.

FIG. 2 is a block diagram illustrating implementation of a coax server 114 according to a specific embodiment of the invention. The core process of coax server 114 is stream pump 202 which is a multi-threaded manager that manages the streams of data directed to STBs on the coax infrastructure. Stream pump 202 allocates the program streams in the coax channel multiplex and performs streaming of IP data into the multiplex. Stream pump 202 receives data from multiple external sources, i.e., head end server 106, VOD server 108, and media server 110, and manages operation of QAM up-converter 204 which generates the QAM output transmitted on the coax infrastructure. According to a particular implementation, stream pump 202 receives the IP stream source details (e.g., multicast/unicast protocol, interface, IP address, port number) and the required data bandwidth. Stream pump 202 then allocates bandwidth within a suitable channel on a "best fit" basis. According to a specific implementation, up-converter 204 is the Q8 PCI adapter provided by VideoPropulsion Interactive Television, Inc. of Slinger, Wis.

Figure 5:
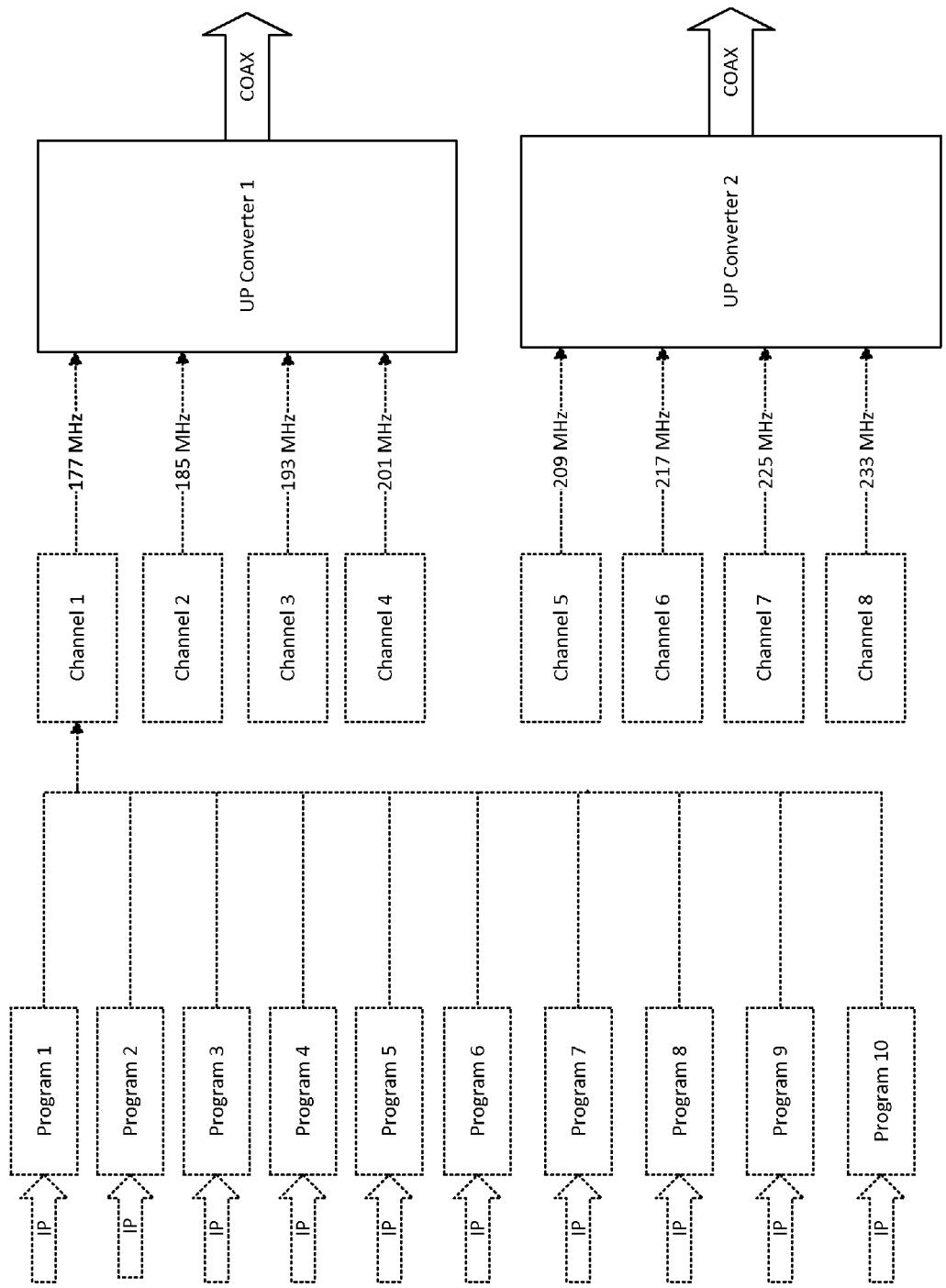
FIG. 5 shows an example program/frequency allocation according to an embodiment of the invention.

Clients are returned a pointer to a structure containing the program details including the Program ID and frequency. FIG. 5 shows an example program/frequency allocation. In this example, programs 1-10 are allocated to channel 1 at 177 MHz. A tuner tuned to 177 MHz will be able to select one of the ten programs available.

The data from head end server 106 are multicast data because users can selectively receive live broadcasts. The data from VOD server 108 are unicast data because they are responsive to a request for specific video content by a guest in a particular room. The data from media server 110 may be both multicast (e.g., backdrop videos) and unicast (e.g., content previews and other promotional content).

As discussed above, coax server 114 includes RTSP proxy 206 which mediates requests from RTSP client 208 in STB 104 for unicast content from VOD server 108 and media server 110. With input from RTSP proxy 206 and the relevant server, stream pump 202 places the unicast content on a specific coax channel unknown to any other parts of the system beside the STB from which the request originated, e.g., STB 104. According to a particular implementation, RTSP proxy 206 instructs stream pump 202 to allocate a coax channel of sufficient bandwidth to suit the content and creates a unicast connection to VOD server 108. Proxy 206 then establishes an RTSP connection with VOD Server 108 and maintains the connection, e.g., using keep-alive notices. STB 104 also uses keep-alive notices with proxy 206. The assigned coax program tuning information is returned to STB 104 via proxy 206 in the responses that make up the RTSP connection.

TV Manager 210 is responsible for assigning coax program details for the digital television channels configured on core server 102 based on bandwidth requirements, e.g., HD vs. SD. TV Manager 102 also provides tuning information back to core server 102 mapping the assigned coax channels to the IP addresses of the corresponding digital television channels. This information is then provided to STB 104 (via the IP-over-coax path) so that tuner 212 can tune to the channels selected by the guest via the IP-over-coax path from STB 104 to core server 102.

TV Manager 210 fetches the TV channel line-up from core server 102 and instructs stream pump 202 to allocate a coax program for each TV channel. If the line-up changes during operation, an update multicast message is sent from core server 202, and TV manager 210 adjusts its stream allocation instructions to stream pump 202 accordingly. TV Manager 210 then communicates the new tunings back to core server 102 (via an xml file). The STBs then receive the new tunings for the updated channel line-up from core server 102.

Configuration daemon 214 is responsible for managing the configuration settings from the core server to processes operating on coax server 114, and watching for activity on the other servers in the system. Media Channel Manager 216 is responsible for managing the loop of content previews from media server 110. Media Channel Manager 216 generates metadata that are associated with the content loop so that the IP side of the system knows which preview is currently being viewed so that, if a guest chooses to purchase that content (or some other related service), the content is properly identified in the communication from STB 104 to core server 102 via the IP-over-coax return path.

Figure 3:
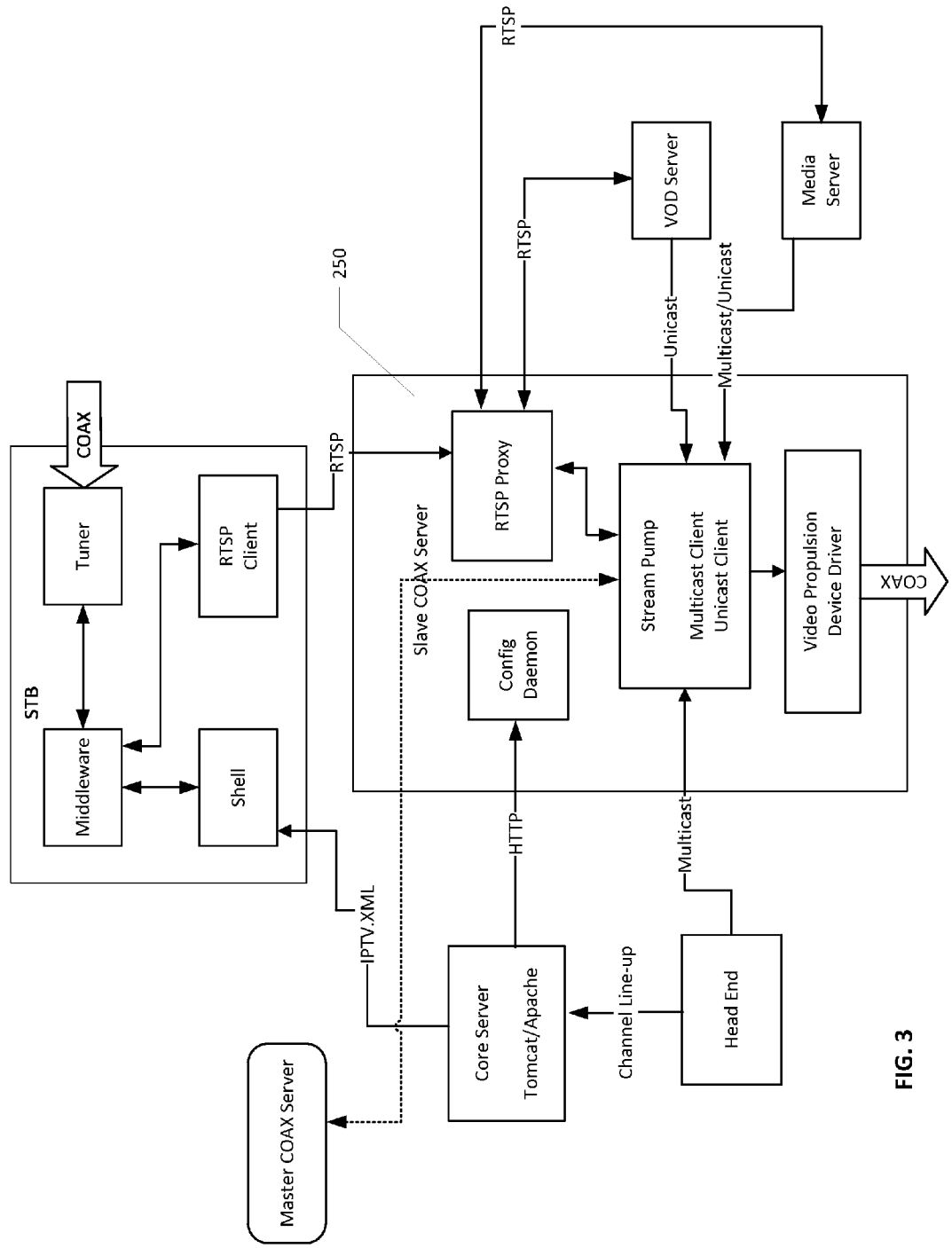
FIG. 3 is a block diagram of a slave coax server implemented according to a specific embodiment of the invention.

To support larger installations that require more coax channels, any number of additional coax servers can be configured as slave coax servers (e.g., slave 250) to integrate with a master coax server (e.g., coax server 114). Such a slave coax server 250 may be implemented as shown in the block diagram of FIG. 3. The depicted processes operate in a manner similar to the corresponding processes in master coax server 114. The difference between master coax server 114 and slave coax server 250 is that the TV Manager and Media Channel Manager processes in server 114 are not required in server 250. That is, according to this particular implementation, only one TV Manager and one Media Channel Manager process are included in the system, each of which assigns jobs to the stream pumps in the all of the coax servers. In such a system, each coax server has a fixed frequency range and is assigned a base frequency. A suitable frequency range might be, for example, 64 MHz (i.e., 8 channels with 8 MHz spacing) with a starting base frequency of 50 MHz.

According to various embodiments, coax servers implemented in accordance with the invention operate independently of any encryption scheme encoded in the media streams. That is, such coax servers are not required to decrypt or alter the encryption data associated with such schemes in any way. According to a specific embodiment, coax servers are implemented to operate with unencrypted MPEG-2, H.264, ETVCrypt3, and Verimatrix.

While the invention has been particularly shown and described with reference to specific embodiments thereof, it will be understood by those skilled in the art that changes in the form and details of the disclosed embodiments may be made without departing from the spirit or scope of the invention. For example, specific details have been described herein that are specific to the context in which the implementation is intended to be deployed, e.g., DVB-C, the European digital television standard. However, those of skill in the art will appreciate that such details may be modified for implementation in a different context without departing from the scope of the invention, e.g., the relevant standards in the U.S. or any other country or region. Other examples of this relate to the use of solutions from specific vendors in implementing particular system components, e.g., a Video-Propulsion up-converter in the coax server. Suitable alternatives will be apparent to those of skill in the art. And the types of information and data services provided in accordance with the invention are not intended to be limited to the services described herein, e.g., digital television and video-on-demand. Rather, any type of information or data service that may be delivered in a program stream may be delivered according to the invention.

In addition, the functionality described herein may be implemented in a wide variety of ways without departing from the scope of the invention. For example, functionalities described herein may be implemented using computer program instructions stored in physical memory, e.g., any type of RAM or ROM, associated with the particular computing devices performing the described functions. Any of the various computing and programming tools and languages known to those of skill in the art which may be adapted for such purposes are within the scope of the present invention. Alternatively, at least some of the described functionality may be implemented using other types of hardware such as, for example, programmable logic devices, field-programmable gate arrays, application-specific integrated circuits, and the like. Again, suitable alternatives will be apparent to those of skill in the art.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A system comprising:
a coax transmission infrastructure formed by coaxial cable over which data are transmitted using a radio frequency (RF) modulation scheme;
a plurality of coax client devices each including an RF tuner supporting the RF modulation scheme connected to the coax transmission infrastructure;
an Internet Protocol (IP) transmission infrastructure formed by twisted pair wire over which data are transmitted using IP;
a media on demand server connected to the IP transmission infrastructure; and
a coax server coupled to both the coax transmission infrastructure and the IP transmission infrastructure for acting as a proxy between these two infrastructures;
wherein, when acting as the proxy between the coax transmission infrastructure and the IP transmission infrastructure, the coax server is operable to:
provide a real time streaming protocol (RTSP) proxy operable to a) communicate with an RTSP client in a particular one of the coax client devices via an RTSP connection utilizing an IP-over-coax modulation scheme over the coax transmission infrastructure and b) communicate with the media on demand server via the IP transmission infrastructure;
receive by the RTSP proxy an incoming request from the particular one of the coax client devices;
transmit by the RTSP proxy a request for specific media content to the media on demand server in response to receiving the incoming request from the particular one of the coax client devices;
receive by the RTSP proxy a media stream over the IP transmission infrastructure from the media on demand server, the media stream corresponding to the specific media content;
allocate a coax channel of sufficient bandwidth on the coax transmission infrastructure and transmit the media stream on the coax channel utilizing the RF modulation scheme; and
send to the particular one of the coax client devices by the RTSP proxy via the RTSP connection a pointer indicating the coax channel on which the media stream is being transmitted; wherein the coax channel on which the media stream is transmitted is different than the RTSP connection.

2. The system of claim 1, wherein the RF modulation scheme comprises either quadrature amplitude modulation (QAM) or quadrature phase shift keying (QPSK).

3. The system of claim 1, wherein the media stream received by the coax server over the IP transmission infrastructure from the media on demand server is a unicast stream.

4. The system of claim 1, wherein the media stream received over the IP transmission infrastructure from the media on demand server is a multicast stream.

5. The system of claim 1, further comprising an IP-coax modem facilitating transmission of the RTSP connection between the particular one of the coax client devices and the coax server via the coax transmission infrastructure using the IP-over-coax modulation scheme.

6. The system of claim 1, wherein the coax server is further operable to provide metadata in association with the media stream transmitted to the particular one of the coax client devices via the coax transmission infrastructure.

7. The system of claim 1, further comprising a wireless access point facilitating transmission of the RTSP connection between the particular one of the coax client devices and the coax server using an IP-over-WiFi path.

8. The system of claim 1, wherein:
the coax transmission infrastructure is installed in a first part of a hospitality establishment; and
the IP transmission infrastructure is installed in a second part of the hospitality establishment.

9. The system of claim 8, wherein the coax client devices are set top boxes (STBs) configured to control operation of associated televisions located in guest rooms in the first part the hospitality establishment.

10. The system of claim 1, further comprising:
a plurality of second client devices coupled to the IP transmission infrastructure;
wherein the second client devices are operable to request and receive media content directly from the media on demand server via the IP transmission infrastructure without involvement of the coax server.

11. A method of acting as a proxy between a coax transmission infrastructure and an Internet Protocol (IP) transmission infrastructure, the method comprising:
providing a real time streaming protocol (RTSP) proxy operable to a) communicate via an RTSP connection with an RTSP client in a particular one of a plurality of coax client devices utilizing an IP-over-coax modulation scheme over the coax transmission infrastructure and b) communicate with a media on demand server via the IP transmission infrastructure; wherein the coax transmission infrastructure is formed by coaxial cable over which data are transmitted using a radio frequency (RF) modulation scheme, and the coax client devices each include an RF tuner supporting the RF modulation scheme;
receiving by the RTSP proxy an incoming request from the particular one of the coax client devices;
transmitting by the RTSP proxy a request for specific media content to the media on demand server in response to receiving the incoming request from the particular one of the coax client devices; wherein the IP transmission infrastructure is formed by twisted pair wire over which data are transmitted using IP, and the media on demand server is connected to the IP transmission infrastructure;
receiving by the RTSP proxy a media stream over the IP transmission infrastructure from the media on demand server, the media stream corresponding to the specific media content;
allocating a coax channel of sufficient bandwidth on the coax transmission infrastructure and transmitting the media stream on the coax channel utilizing the RF modulation scheme; and
sending to the particular one of the coax client devices by the RTSP proxy via the RTSP connection a pointer indicating the coax channel on which the media stream is being transmitted; wherein the coax channel on which the media stream is transmitted is different than the RTSP connection.

12. The method of claim 11, wherein:
the coax transmission infrastructure is installed in a first part of a hospitality establishment; and
the IP transmission infrastructure is installed in a second part of the hospitality establishment.

13. The method of claim 12, wherein the coax client devices are set top boxes (STBs) configured to control operation of associated televisions located in guest rooms in the first part the hospitality establishment.

14. The method of claim 11, wherein the RF modulation scheme comprises either quadrature amplitude modulation (QAM) or quadrature phase shift keying (QPSK).

15. The method of claim 11, wherein the media stream received over the IP transmission infrastructure from the media on demand server is a unicast stream.

16. The method of claim 11, wherein the media stream received over the IP transmission infrastructure from the media on demand server is a multicast stream.

17. The method of claim 11, further comprising facilitating by an IP-coax modem transmission of the RTSP connection between the particular one of the coax client devices and the coax server via the coax transmission infrastructure using the IP-over-coax modulation scheme.

18. The method of claim 11, further comprising providing metadata in association with the media stream transmitted to the particular one of the coax client devices via the coax transmission infrastructure.

19. The method of claim 11, further comprising facilitating by a wireless access point transmission of the RTSP connection between the particular one of the coax client devices and the coax server using an IP-over-WiFi path.

20. The method of claim 11, further comprising:
providing a plurality of second client devices coupled to the IP transmission infrastructure; and
requesting and receiving media content by the second client devices directly from the media on demand server via the IP transmission infrastructure without involvement of the coax server.

21. A non-transitory computer-readable medium comprising computer executable instructions that when executed by one or more computers cause the one or more computers to perform a plurality of steps for acting as a proxy between a coax transmission infrastructure and an Internet Protocol (IP) transmission infrastructure, the steps comprising:

providing a real time streaming protocol (RTSP) proxy operable to a) communicate via an RTSP connection with an RTSP client in a particular one of a plurality of coax client devices utilizing an IP-over-coax modulation scheme over the coax transmission infrastructure and b) communicate with a media on demand server via the IP transmission infrastructure; wherein the coax transmission infrastructure is formed by coaxial cable over which data are transmitted using a radio frequency (RF) modulation scheme, and the coax client devices each include an RF tuner supporting the RF modulation scheme;

receiving by the RTSP proxy an incoming request from the particular one of the coax client devices;

transmitting by the RTSP proxy a request for specific media content to the media on demand server in response to receiving the incoming request from the particular one of the coax client devices; wherein the IP transmission infrastructure is formed by twisted pair wire over which data are transmitted using IP, and the media on demand server is connected to the IP transmission infrastructure;

receiving by the RTSP proxy a media stream over the IP transmission infrastructure from the media on demand server, the media stream corresponding to the specific media content;

allocating a coax channel of sufficient bandwidth on the coax transmission infrastructure and transmitting the media stream on the coax channel utilizing the RF modulation scheme; and sending to the particular one of the coax client devices by the RTSP proxy via the RTSP connection a pointer indicating the coax channel on which the media stream is being transmitted; wherein the coax channel on which the media stream is transmitted is different than the RTSP connection.

* * * * *